(12) United States Patent
Viola et al.

(10) Patent No.: US 12,344,480 B2
(45) Date of Patent: Jul. 1, 2025

(54) BELLOWS PROTECTION ADAPTED TO CONNECT ADJACENT TROLLEYS OF A CONVEYOR BELT

(71) Applicant: LA PROTEC SRL, San Giovanni In Croce (IT)

(72) Inventors: Riccardo Viola, Parma (IT); Tommaso Viola, San Giovanni In Croce (IT)

(73) Assignee: LA PROTEC SRL, San Giovanni in Croce (IT)

( * ) Notice: Subject to any disclaimer, the term of this patent is extended or adjusted under 35 U.S.C. 154(b) by 104 days.

(21) Appl. No.: 18/264,404

(22) PCT Filed: Feb. 9, 2022

(86) PCT No.: PCT/IT2022/050023
§ 371 (c)(1),
(2) Date: Aug. 4, 2023

(87) PCT Pub. No.: WO2022/172307
PCT Pub. Date: Aug. 18, 2022

(65) Prior Publication Data
US 2024/0300745 A1    Sep. 12, 2024

(30) Foreign Application Priority Data
Feb. 12, 2021   (IT) .......................... 102021000003209

(51) Int. Cl.
*B65G 17/34* (2006.01)
(52) U.S. Cl.
CPC .......... *B65G 17/34* (2013.01); *B65G 2207/40* (2013.01)
(58) Field of Classification Search
None
See application file for complete search history.

(56) References Cited

U.S. PATENT DOCUMENTS 9,233,803 B2 *  1/2016  Pilarz ................... B65G 17/345
10,329,094 B1   6/2019  Fitzpatrick et al.
(Continued)

FOREIGN PATENT DOCUMENTS

CN   105059897 A    11/2015
CN   204896736 U *  12/2015
(Continued)

OTHER PUBLICATIONS

International Search Report and Written Opinion of the ISA for PCT/IT2022/050023 mailed May 31, 2022, 12 pages.

*Primary Examiner* — Kavel Singh
(74) *Attorney, Agent, or Firm* — NIXON & VANDERHYE

(57) ABSTRACT

Disclosed is a bellows protection connecting adjacent trolleys of a conveyor belt along an object transport line, where the conveyor belt includes trolleys movable along tracks and connected to one another by connectors allowing their reciprocal rotation at least around a vertical or horizontal axis. The device includes: a pleated covering positioned between two adjacent trolleys and connected thereto; a beam supporting the covering transversely to the direction of advancement of the transport line; and a base structure resisting vertically directed forces and supporting the beam. The base structure includes a reinforcing element binding in at least one point the beam. The reinforcing element includes: a first punctiform binder connecting it to at least one of the two trolleys; and a second punctiform binder connecting it to the at least one beam and adapted to avoid reciprocal transversal sliding between it and the at least one beam.

16 Claims, 6 Drawing Sheets

(56) References Cited

U.S. PATENT DOCUMENTS

| | | | | |
|---|---|---|---|---|
| 10,906,741 B2* | 2/2021 | Kaeser | ................ | B65G 17/066 |
| 10,934,096 B1* | 3/2021 | Schuyler | ............ | B65G 21/2054 |
| 11,745,958 B2* | 9/2023 | Eisinger | ................ | B60T 1/062 |
| | | | | 198/370.03 |
| 11,873,166 B2* | 1/2024 | Briano | ................... | B65G 47/66 |
| 2003/0221935 A1* | 12/2003 | Barklin | ................ | B65G 47/96 |
| | | | | 209/559 |

FOREIGN PATENT DOCUMENTS

| | | |
|---|---|---|
| DE | 102018009974 B3 | 4/2020 |
| EP | 1122108 A2 | 8/2001 |
| EP | 3334671 A1 | 6/2018 |
| EP | 3670071 A1 | 6/2020 |
| WO | 2017025991 A1 | 2/2017 |

\* cited by examiner

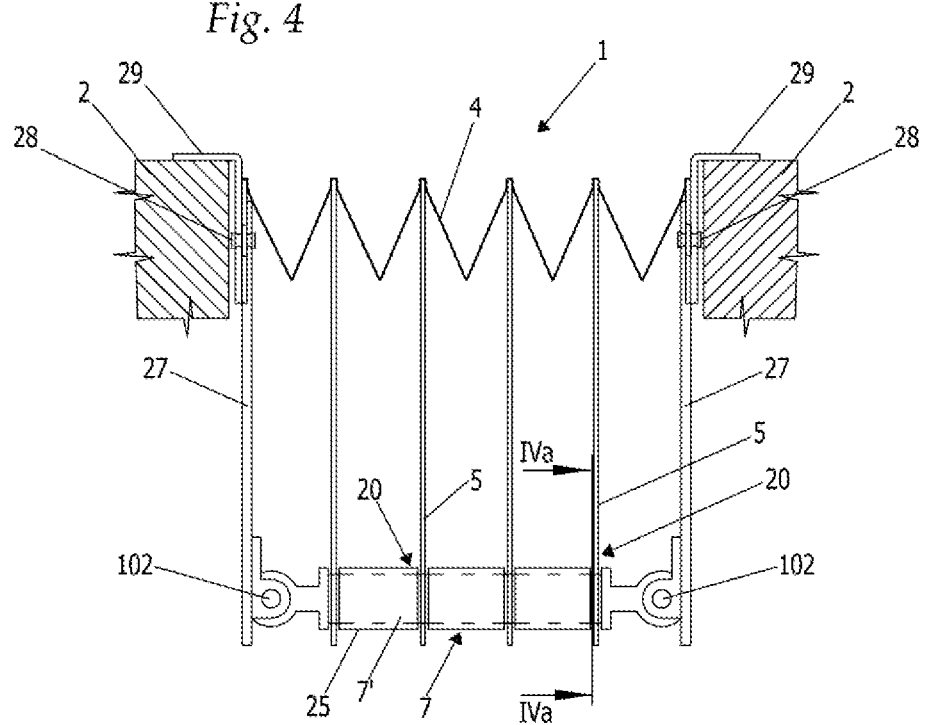
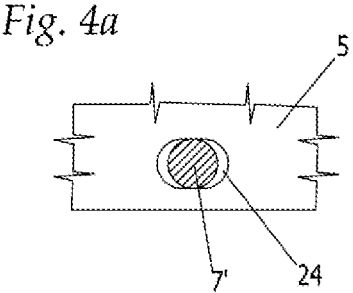
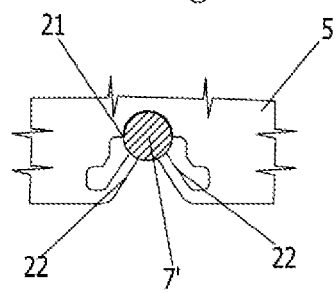
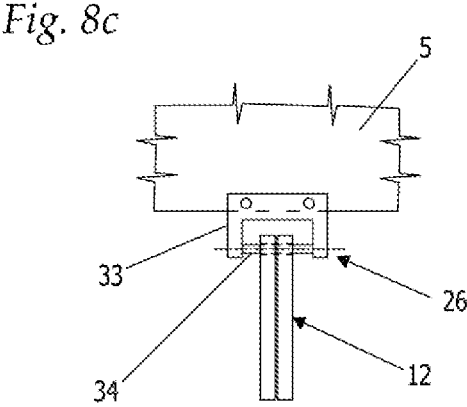
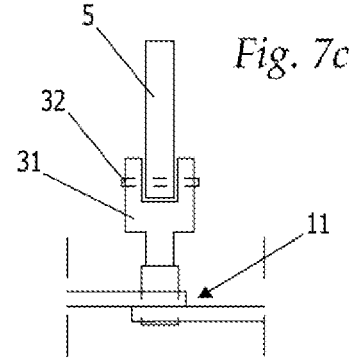

BELLOWS PROTECTION ADAPTED TO CONNECT ADJACENT TROLLEYS OF A CONVEYOR BELT

CROSS-REFERENCE TO RELATED APPLICATIONS

This application is the US national stage of PCT/IT2022/050023, filed Feb. 9, 2022, and designating the United States, which claims the priority of IT 102021000003209, filed Feb. 12, 2021. The entire contents of each foregoing application are incorporated herein by reference.

TECHNICAL FIELD OF APPLICATION

The invention relates to the sector of accessory mechanical components for conveyor belts, and in particular the invention relates to a bellows protection adapted to connect adjacent trolleys in a material conveyor line, usable for example in sorting and logistical centres for conveying packages, cartons, pallets, sacks, crates, etc. . . .

STATE OF THE ART

To better manage the activities of a logistics chain, operators often conduct sorting activities, carried out both within warehouses, and for the management of shipping and distribution of third-party goods, aimed at sorting a set of packages and/or shipments into a number of sub-sets.

Recognition of small parcels, packages, boxes, containers or envelopes is automated by means of a sorter, or selector, i.e. a system consisting of a moving conveyor belt comprising multiple inlets and outlets connected thereto, capable of transporting and selecting goods.

The conveyor belts referred to for the purpose of the present invention comprise tracks and a plurality of trolleys adapted to support the materials to be moved.

The trolleys are movable along said tracks along a direction of advancement.

Said trolleys are placed in sequence and are connected to one another by means of connecting means that allow their reciprocal rotation, both in a horizontal plane and in a vertical plane. The trolleys need to be able to move along curved tracks, and therefore they need to be able to steer with respect to each other; similarly, the conveyor belts also need to be able to move along a route that includes changes in height, and therefore the trolleys need to be able to vary their inclination.

The conveyor belts also comprise a plurality of bellows protections interposed between adjacent trolleys and associated thereto, adapted to close the free space between trolleys, thereby preventing the transported packages from falling.

These protections also provide valid protection against dirt or the insertion along the tracks and between the trolleys of external elements that could compromise the efficiency and duration of the conveyor belt.

These bellows protections comprise a covering in pleated canvas, and a plurality of beams, generally made of PVC, adapted to support said covering, which is not self-supporting.

These beams can move away from and towards one another, thereby allowing the covering to stretch out and fold up respectively, following the movement of the trolleys along the direction of advancement of the conveyor belt and changes in direction.

These bellows protections are completely passive elements, with no ability to withstand any accidental load arriving from outside, as could be the case when handling objects of greatly different weight and/or size, as is typical of the parcel sector (couriers and forwarding agents) and where it may happen that certain objects may protrude, in whole or in part, from the conveyor for which they were intended.

The bellows protections are thus subject to deformations, or even breakage, which can result in malfunctions of the entire conveyor belt.

Patent application No. EP 3334671 A1 describes bellows protections provided with a load-bearing structure, adapted to be positioned underneath said covering to support it and prevent it from flexing or deforming under the weight of any loads above.

Said bearing structure comprises a base structure and a frame resting on said base structure, said base structure and said frame being rigid and cooperating with one another in sliding contact, being positioned between adjacent trolleys beneath said bellows protections.

Said base structure comprises cantilever plates extending from each trolley towards the empty space beneath the covering; said frame comprises beams arranged along the cusps of the pleated canvas, supported by said plates and sliding thereon.

This type of bellows protection with a bearing structure has certain limits and disadvantages, particularly due to the sliding of the frame beams on the cantilever plates of the base structure.

This sliding causes wear and results in the need for constant maintenance of the entire conveyor belt, with consequent economic disadvantages. Furthermore, the sliding can generate friction and seizing between the parts, resulting in slowing down the alternating movement of the protection, and in problems of noise.

Even more disadvantageously, the possible deposit of dirt and residues during the continuous alternating movement of the protection as it opens and closes, may obstruct the bearing structure and its components for fastening to the trolleys. More generally, dirt and residues may damage the conveyor belt, jam its movement and compromise its motion.

Furthermore, said bearing structure constructed in two parts (base structure and frame), mean that the conveyor belt is relatively very thick, thereby making it bulky and heavier. The natural weight of the bellows protection results in a slowing of the movement of the conveyor belt, with consequent problems of productivity, and relative economic disadvantages due also to the higher energy consumption.

Moreover, the fastening of the base structure to the trolleys is of an interlocking type, and therefore does not permit adaptation to an uneven trajectory of the conveyor belt.

PRESENTATION OF THE INVENTION

The object of the invention is to overcome these limits.

The object of the invention is to provide a bellows protection having structural and functional characteristics that can overcome the aforementioned problems, and that is stable, not subject to transversal bending, not bulky, light, functional, strong and durable.

A further object of the invention is to provide a bellows protection that is easy and economical to produce, as well as being quick and easy to assemble, apply to the trolleys and install along the conveyor belts.

These objects are achieved with a bellows protection adapted to connect adjacent trolleys of a conveyor belt along an object transport line, where said conveyor belt comprises a plurality of trolleys movable along tracks and connected to one another by means of connecting means adapted to allow their reciprocal rotation at least around a vertical or horizontal axis, and where said bellows protection comprises:

- a pleated covering arranged between two adjacent trolleys and connected thereto;
- at least one beam adapted to support said covering transversely to the direction of advancement of said transport line;
- a base structure adapted to resist vertically directed forces and to support said at least one beam,
  - characterized in that said base structure comprises at least one reinforcing element positioned so as to bind in at least one point said at least one beam, where said at least one reinforcing element comprises:
    - first punctiform binding means adapted to connect it at least indirectly to at least one of said two trolleys;
    - second punctiform binding means adapted to connect it to said at least one beam and adapted to avoid reciprocal transversal sliding between it and said at least one beam.

According to a first aspect of the invention, said at least one reinforcing element is positioned transversely to said at least one beam, comprises a first and second end, and at least one of said ends is associated with one of said trolleys by means of said first punctiform binding means.

Alternatively, said first punctiform binding means comprise interlocking means or spherical hinge means.

In a first embodiment variant, said at least one reinforcing element comprises an elongated rigid element having a length substantially equivalent to the distance between said two adjacent trolleys measured at the point of invariance thereof.

In a second embodiment variant, said at least one reinforcing element comprises a telescopic element comprising at least one rod and one jacket where said at least one beam is stably bound to said jacket.

Advantageously, said bellows protection comprises a plurality of beams, said at least one reinforcing element comprises a plurality of telescopic elements linked together, each telescopic element comprising a rod and a jacket, where each beam is stably bound to the jacket of one of said telescopic elements.

In a preferred variant of the invention, said at least one reinforcing element comprises an articulated element which develops in a horizontal or vertical plane with respect to said covering, where said articulated element comprises a plurality of second punctiform binding means for said plurality of beams.

In a further variant, said at least one reinforcing element comprises an elongated rigid element, stably associated with one of said trolleys by means of said interlocking means and protruding with respect to said trolley.

According to further aspects of the invention, said at least one reinforcing element is placed substantially at the point of invariance of the distance between two adjacent trolleys along said transport line.

Preferably, said at least one reinforcing element is placed at an end of said at least one beam.

According to another aspect, said second punctiform binding means comprise interlocking means.

In a preferred embodiment, said second punctiform interlocking binding means comprise a seat, created on said at least one beam, comprising at least one flexible fin adapted to elastically deform due to the introduction of said at least one reinforcing element into said seat and to resume its original position once insertion has been completed, thereby holding said reinforcing element in a stable position.

According to an alternative embodiment, said second punctiform interlocking binding means comprise a hole, created on said at least one beam, adapted to house said reinforcing element, and at least two spacer elements, fitted onto said reinforcing element, placed between said trolleys and said beam, symmetrically thereto, adapted to distance and maintain in a stable position said beam along said reinforcing element and to avoid reciprocal transversal sliding between them.

Advantageously, said hole is slotted.

Alternatively, said second punctiform binding means comprise hinges with a horizontal axis parallel to said at least one beam.

A bellows protection according to the invention offers several advantages, described below.

Said reinforcing element, as mentioned above, prevents bending and deformation of the protection when subjected to accidental loads.

A reinforcing element of the type comprising several telescopic elements, or of the articulated element type, does not need to be situated in a certain position below the protection: it does not necessarily have to be positioned at the point of invariance of the distance between the trolleys, but having the possibility to stretch and shorten, it can follow the changes of configuration of the pleated covering and can therefore also be placed in end positions, precisely where the bellows protection varies its extension according to the reciprocal movement of the adjacent trolleys.

Said first punctiform means of binding the reinforcing element to the trolleys, in the spherical hinge variant, give the conveyor belt flexibility, and make it possible to adapt the bellows protection even between trolleys moving on a horizontal plane along curved trajectories or even where there are changes of height.

Said second punctiform binding means stably fix the beams of the bellows protection covering to said reinforcing element, without reciprocal sliding.

Avoiding sliding between the beams and reinforcing element by means of the second punctiform binding means reduces the risk of friction or seizing and thereby preserves the bellows protection from wear; even in the presence of dirt and residues there is no risk of jamming, and the correct, smooth movement of the protection is guaranteed. This benefits the entire conveyor belt, in terms of speed of movement and reduced noise.

Said second punctiform binding means comprising a seat created in the beam of the bellows protection, exploit the elastic return of the material of which the seat is made, for example PVC, and in particular the flexible fin, so as to obtain a secure interlocking attachment with the reinforcing element.

Said second punctiform binding means comprising a hole created in the beam of the protection are also more stable and hard-wearing; the slotted hole, in particular, compensates for any minimal play in the attachment between the parts, while preventing transversal sliding of the beams on the reinforcing element.

The bellows protection in all its variants is compact, non-bulky and easy to manufacture.

The reduced total thickness of the telescopic protection also reduces the weight, thereby advantageously increasing the speed of movement of the entire conveyor belt and the productivity of the transport line, while keeping relative costs low.

Lastly, the bellows protection created according to the invention is stable, strong and durable.

BRIEF DESCRIPTION OF DRAWINGS

These and further advantages of the invention will become evident from the following descriptions of preferred embodiments thereof, given by way of non-limiting example, and with the aid of the accompanying drawings, where:

FIGS. 4, 5, 6, 7a, 8a, 8b, 9 and 10 show lateral plan views of a bellows protection according to possible embodiment variants of the invention;

FIG. 4a shows a longitudinal cross-section along a vertical plane of a detail of the bellows protection shown in FIG. 4;

FIG. 4b shows a longitudinal cross-section along a vertical plane of a possible variant of the detail shown in FIG. 4a;

FIG. 7b shows a plan view from below of a bellows protection shown in FIG. 7a;

FIG. 7c shows a transversal cross-section along a vertical plane of a detail of the bellows protection shown in FIG. 7a;

FIG. 8c shows a longitudinal cross-section along a vertical plane of a detail of the bellows protection shown in FIG. 8b;

DETAILED DESCRIPTION OF PREFERRED EMBODIMENTS OF THE INVENTION

Figure 1:
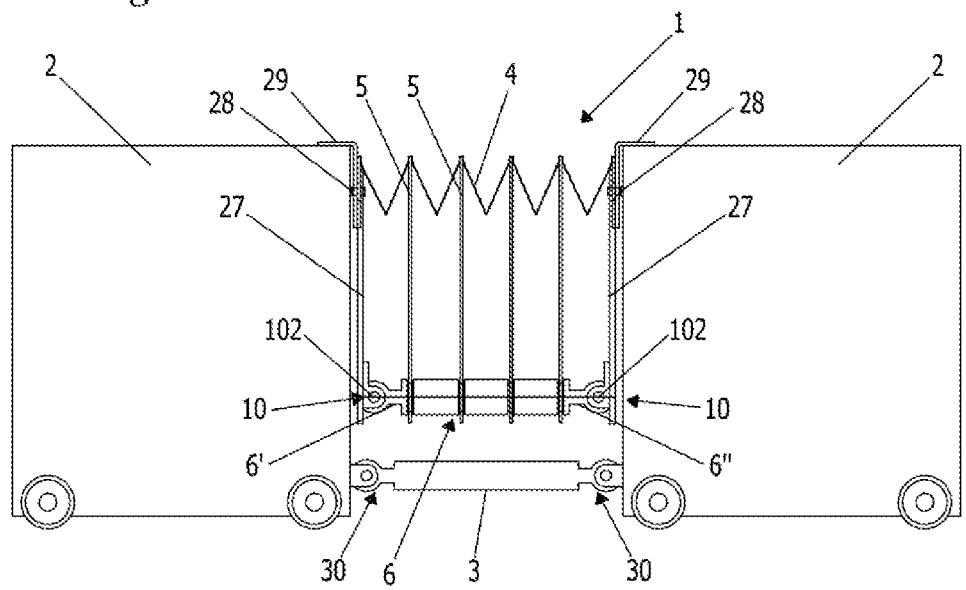
FIG. 1 shows a lateral plan view of a section of a conveyor belt comprising a bellows protection connecting two adjacent trolleys according to a first variant of the invention.

With reference to FIG. 1, a section of a conveyor belt is shown that can be used for example in sorting and logistical centres.

Said conveyor belt, according to known art, is of a type comprising a plurality of trolleys 2 movable along tracks (not illustrated) and connected to one another by means of connecting means adapted to allow their reciprocal rotation at least around a vertical or horizontal axis. Said conveyor belt is movable along an object transport line developing on a horizontal plane with straight-line or curved trajectories. In the following description, reference will also be made to variants adapted to be used with conveyor belts running along an object transport line comprising differences and variations in height.

In particular, FIG. 1 shows two adjacent trolleys 2 connected to one another by means of a rod 3. The ends of said rod 3 are bound to said trolleys 2 by means of spherical hinges 30.

Said conveyor belt comprises bellows protections 1 adapted to connect adjacent trolleys 2 and to close the space between them.

The bellows protection 1, shown in Figured 1 and 2, essentially comprises:

a pleated covering 4 positioned between two adjacent trolleys 2 and connected thereto;

a plurality of beams 5, advantageously made of PVC, adapted to support said covering 4 transversely to the direction of advancement of said transport line, where each beam 5 is fixed inside a cusp of the pleating of said covering of said covering 4;

a base structure adapted to resist vertically directed forces, for example adapted to resist the weight of a package transported by said belt and falling from said trolleys 2, and to support said plurality of beams 5.

Said base structure comprises a reinforcing element 6 positioned to bind with at least one point on said plurality of beams 5, to support them and prevent bending or even the collapse of said covering 4.

Said reinforcing element 6 comprises:

first punctiform binding means 10 adapted to connect it to said trolleys 2;

second punctiform binding means 20 adapted to connect it to said beams 5.

Said reinforcing element 6 is positioned transversely to said plurality of beams 5, comprises a first 6' and a second 6'' end, and each of said ends 6', 6'' is associated with one of said trolleys 2 by means of said first punctiform binding means 10.

Each beam 5 è stably associated with said reinforcing element 6 by means of said second punctiform binding means 20, which prevent reciprocal transversal sliding, in other words they prevent the beams 5 from sliding transversely on said reinforcing element 6 along the direction of advancement of said transport line.

Figure 2:
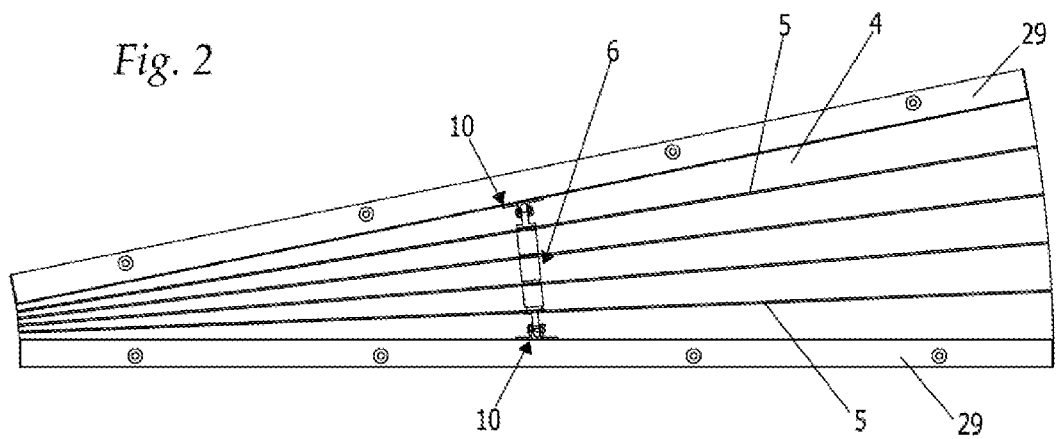
FIG. 2 shows an overhead and partially transparent view of a detail of the bellows protection shown in FIG. 1, during operation.

In the variant shown in FIGS. 1 and 2, said reinforcing element 6 is placed substantially at the point of invariance of the distance between the two adjacent trolleys 2 along the curved trajectory followed by said transport line. Said point of invariance belongs to the vertical plane IT which contains the connecting pin 3 between the two trolleys. In FIG. 2 it is evident that the distance between the two trolleys 2 remains constant at the reinforcing element 6, while the more lateral portions of the trolleys 2 can move towards or away from one another, for example at a bend of the transport line, by folding up or stretching the portion of said bellows protection 1 above.

Figure 3:
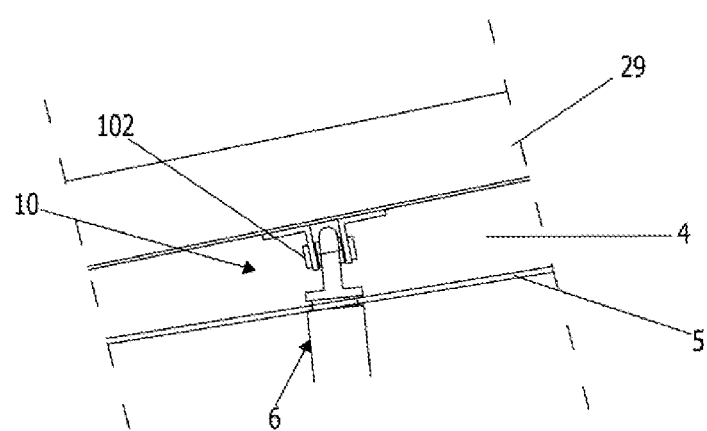
FIG. 3 shows an overhead and partially transparent plan view of a detail shown in FIG. 2.

As is particularly evident from the detail shown in FIG. 3, said first punctiform binding means 10 comprise spherical hinge means 102.

A support panel 27 for said spherical hinges 102 is stably fixed to each trolley. Said support panels 27 are fixed with screws and rivets 28 to L-shaped profiles 29 associated with the trolleys 2, with the interposition of two of said support beams 5 for said pleated covering 4. Said beams 5 are the closest to the trolleys 2, so as to also fix said covering 4 to them at the same time.

With reference to FIG. 4, said reinforcing element comprises an elongated rigid element 7 having a length substantially equivalent to the distance between said two adjacent trolleys 2 measured at the point of invariance.

Said rigid element 7 comprises a cylindrical central core 7' and a plurality of spacer elements 25 for said beams 5, shaped as hollow cylinders coaxial to said core 7'.

The central beams 5, located between the two end beams 5 bound to the trolleys 2, have a greater height to enable them to be stably fixed to said rigid element 7 acting as a reinforcing element.

With particular reference to the detail shown in FIG. 4a, said second punctiform binding means 20 comprise a hole 24, made on each beam 5, adapted to house the core 7' of said rigid element 7.

To prevent sliding of the beams 5 on said rigid element 7, said spacer elements 25 are fitted onto said core 7' and placed alternately with said beams 5 to create, with their thickness, contact planes for the beams, and to keep them at a distance from one another.

To facilitate assembly operations, said spacer elements 25 are made from a flexible material in the form of small hollow cylinders and comprise a longitudinal cut: making use of the spring-like effect obtained with the flexibility of the material, said longitudinal cut can open to allow the cylinders to be fitted onto the core 7' of the rigid element 7 already inserted in the holes 24 on the beams 5.

To compensate for any interlocking play between the components and to make up for any differences in the levels of adjacent trolleys 2 along the along the transport line, said hole 24 is slotted and allows a minimum movement of the rigid element 7 in a direction longitudinal to the beams 5, while transversal movement remains advantageously blocked.

With particular reference to the detail shown in FIG. 4b, a possible construction variant of said second punctiform binding means 20 is illustrated. In this case, said second punctiform binding means 20 are of the quick-fit type and comprise a seat 21, created on each beam 5, comprising a pair of flexible fins 22 adapted to elastically deform upon the introduction of the core 7' of said at least one rigid element 7 into said seat 21, and to resume their initial position once insertion is complete, while holding said rigid element 7 in a stable position.

Figure 5:
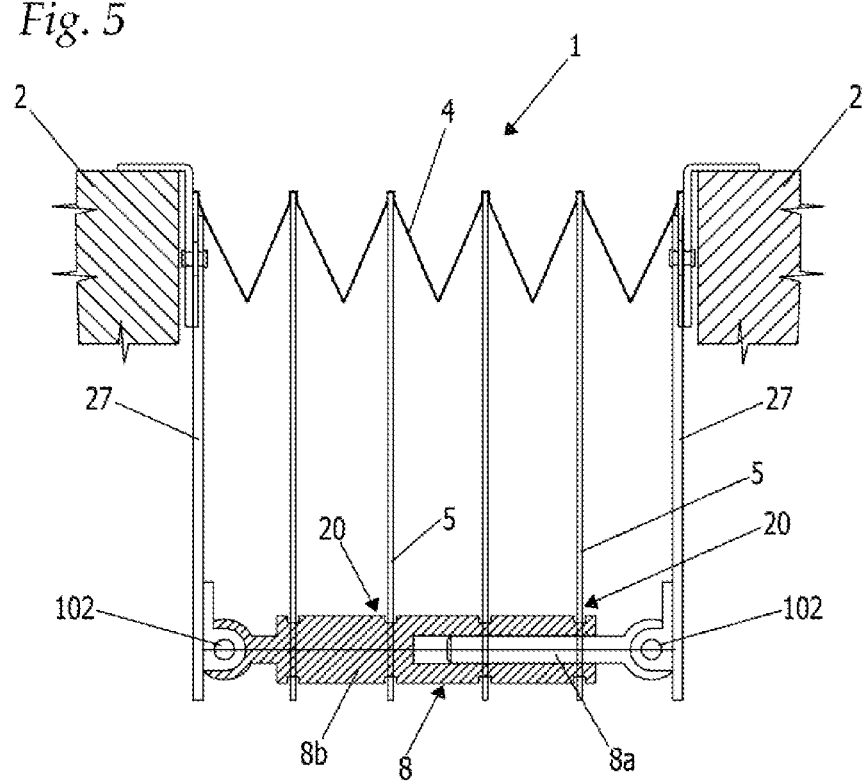

With particular reference to FIG. 5, said reinforcing element comprises a telescopic element 8.

Said telescopic element 8 comprising a rod 8a and a jacket 8b and said beams 5 are stably bound to said jacket 8b. This solution keeps the beams 5 fixed on the reinforcing telescopic element 8 but allows a minimum extension of the covering 4, absorbed only by its end crease, which is useful in the case of conveyor belts with small oscillations or variations in height.

In a possible variant (not shown), there may be two rods 8a, placed at the opposite ends of said jacket 8b.

The second punctiform binding means 20 connecting said beams 5 to said telescopic element 8 may be the same as those illustrated in the variants shown in FIGS. 4a and 4b, equating the jacket 8b of the telescopic element 8 with the rigid element 7 described above.

Figure 6:
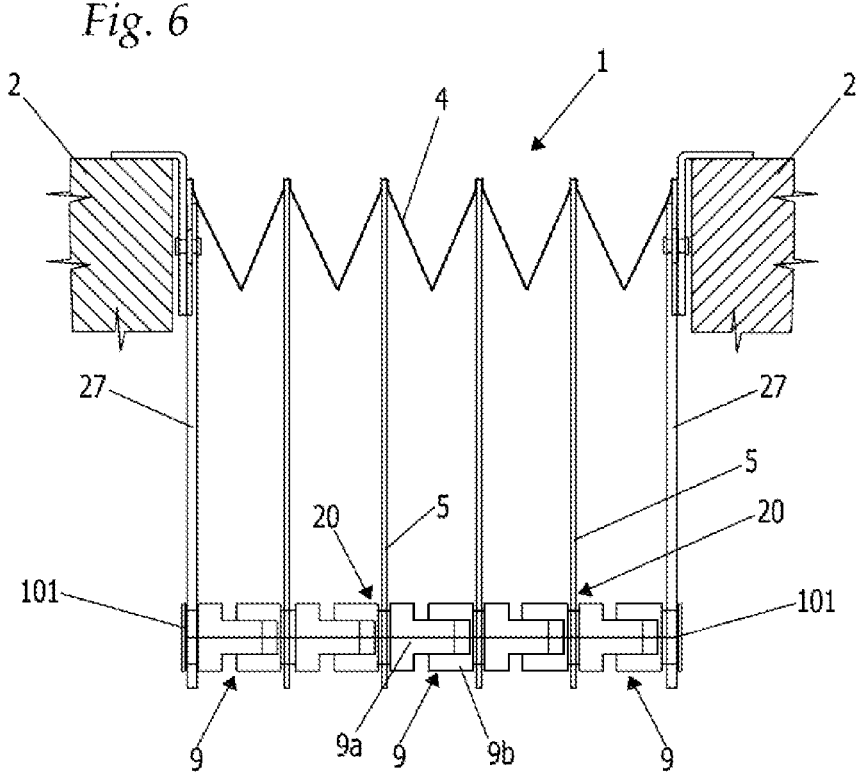

With particular reference to FIG. 6, said reinforcing element comprises a plurality of telescopic elements 9 linked together and consecutive to one another.

Each telescopic element 9 comprises a rod 9a and a jacket 9b, and each beam 5 is stably bound to one of said jackets 9b by means of the punctiform binding means 20 described above.

The beams 5 can move towards or away from one another, thereby shortening or stretching the covering 4 and the entire bellows protection 1, but without sliding on the strengthening element (i.e. on the telescopic elements 9 linked together), thus obtaining all the advantages of the solution object of the present invention.

In this specific variant illustrated, the end telescopic elements 9 are fixed to the panels 27 of the trolleys 2 by means of first punctiform binding means 10 of an interlocking type 101.

Figure 11:
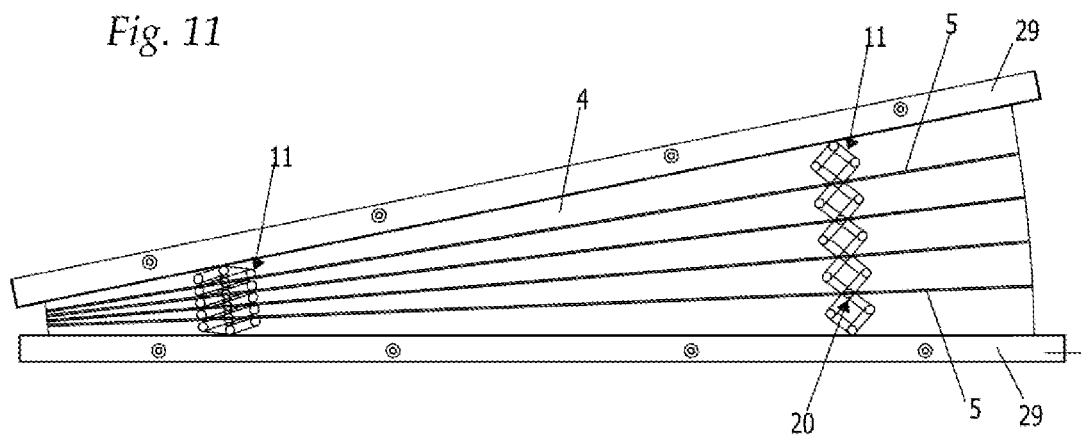
FIG. 11 shows an overhead and partially transparent plan view of a variant of the bellows protection shown in FIG. 7b, during operation.

FIGS. 7a, 7b, 8a, 8b refer to a reinforcing element comprising an articulated element 11, 12 which extends in a horizontal or vertical plane with respect to said covering 4. A version of a horizontal articulated element 11, also when in operation, is illustrated in FIG. 11.

It is evident that an articulated type of reinforcing element 11, 12, substantially a pantograph type, can easily adapt to all possible working configurations of the bellows protection 1, i.e. both when it is fully extended and when it is fully folded. Positioning said articulated reinforcing element also near the ends of the bellows protection 1, and not only at the point of invariance of the distance between the trolleys 2, enables intervention against bending of bellows protection 1 even at the end portions, and not only in the central part. For large-size trolleys and protections, articulated reinforcing elements distributed uniformly below the protection can be advantageous.

Figure 7A:
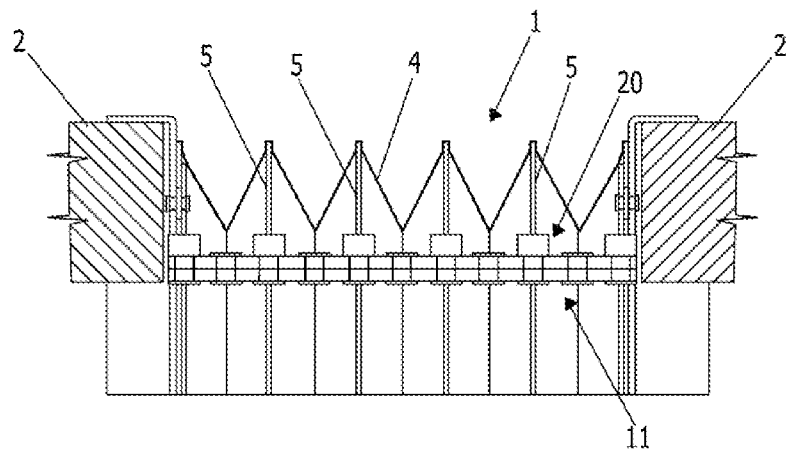
Figure 7B:
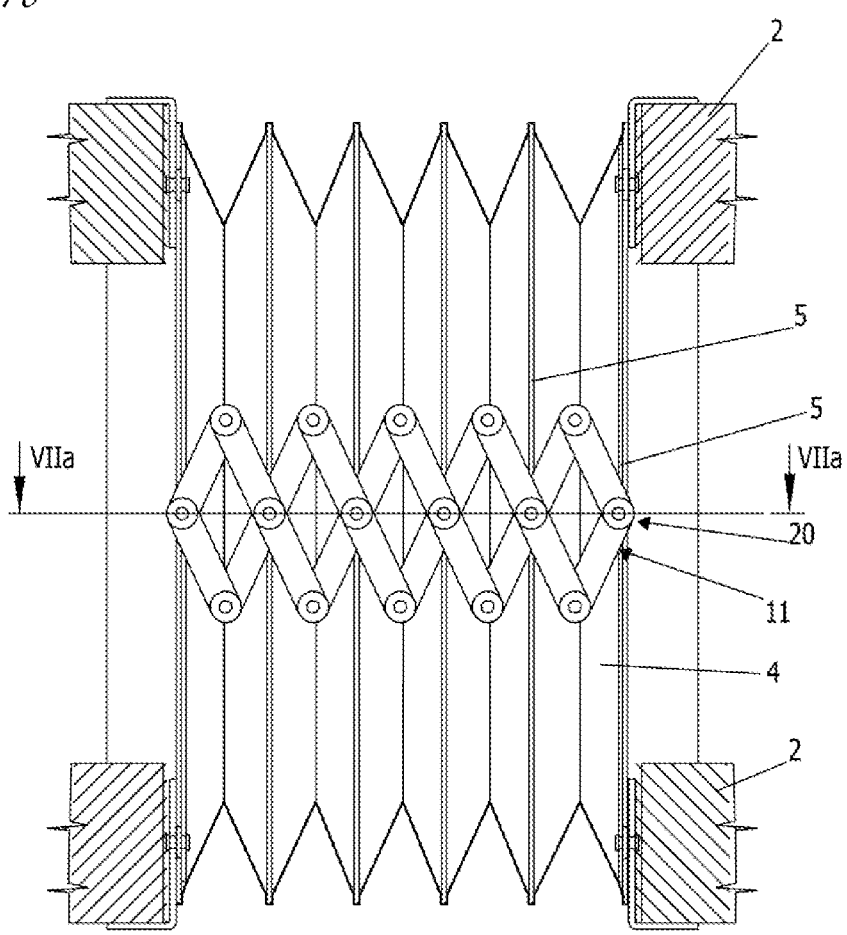

In the variant shown in FIGS. 7a and 7b, relating to an articulated element 11 extending on a horizontal plane, said second punctiform binding means 20, still of the anti-sliding type, comprise a fork 31, bound to said articulated element 11 at each central hinge and orthogonal to the horizontal plane of extension, adapted to house, and to hold for example with screw type fastening means 32, a PVC beam 5 of said bellows protection 1. Said fork 31 is provided by the coupling pin connecting two consecutive rods of the articulated element 11 (FIG. 7c).

Figure 8A:
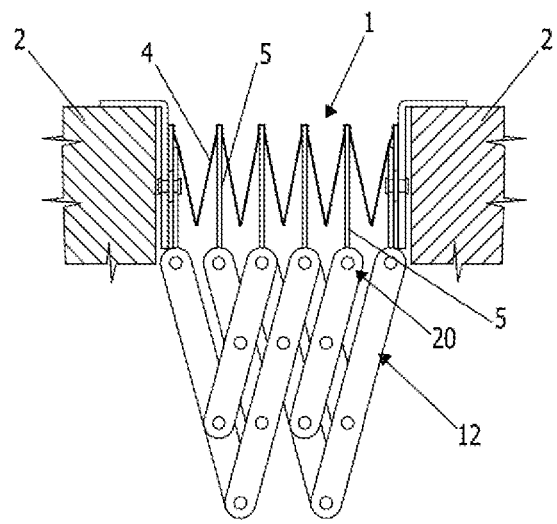
Figure 8B:
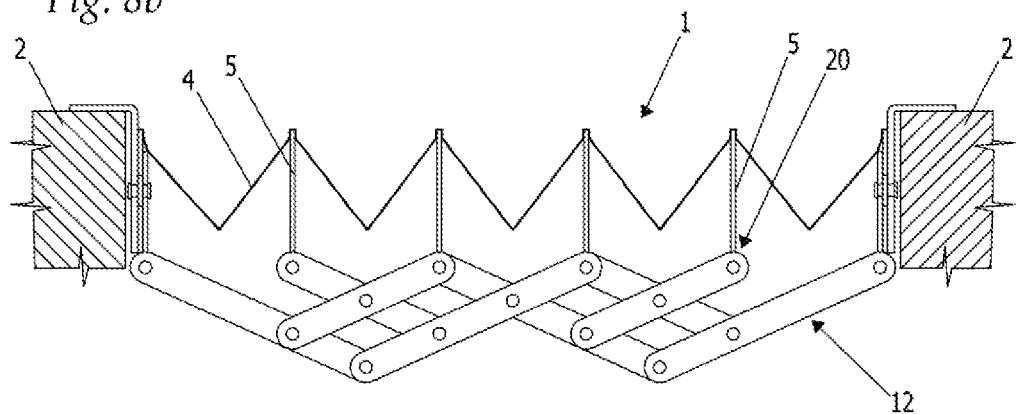

In the variant shown in FIGS. 8a and 8b, relating to an articulated element 12 extending on a vertical plane, said anti-sliding second punctiform binding means 20 comprise hinges with a horizontal axis 26 (FIG. 8c). An inverted U-shape plate is fixed to each beam 5, with a pin 34 placed between the arms. Said pin 34 is provided by the coupling pin connecting two consecutive rods of the articulated element 12.

Figure 9:
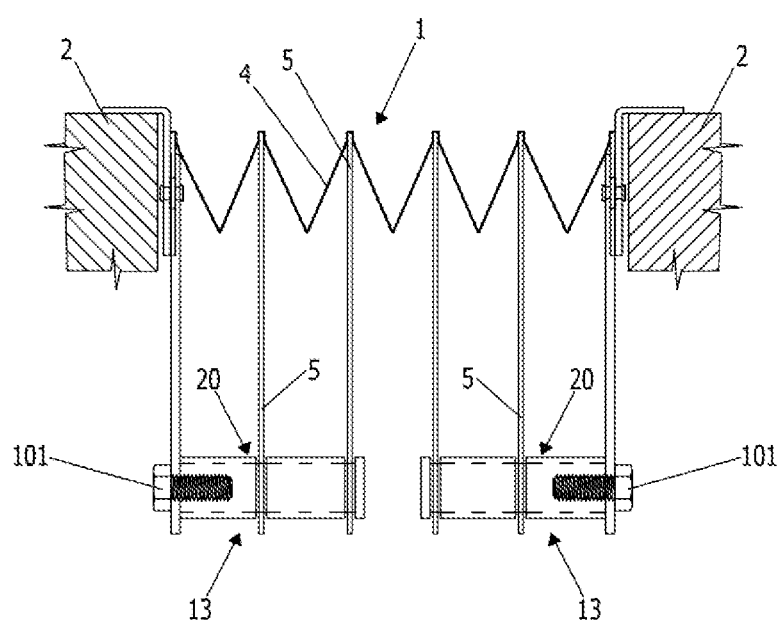
Figure 10:
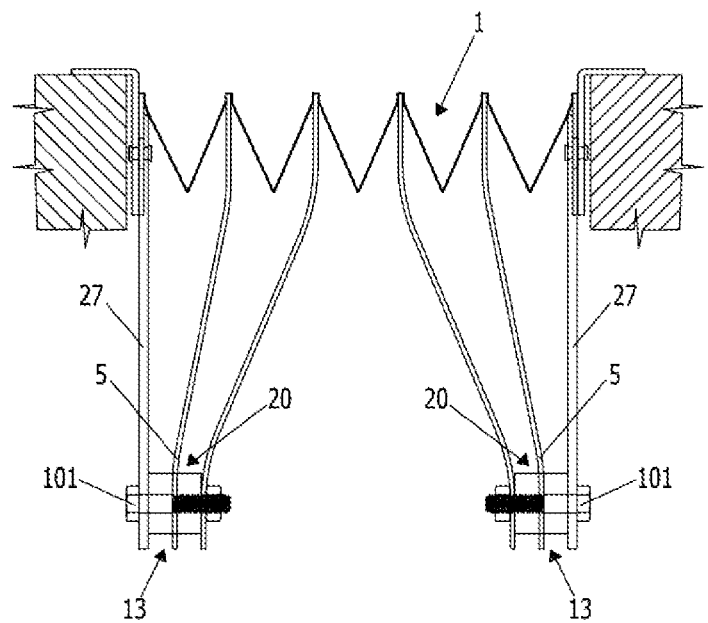

FIGS. 9 and 10 show a reinforcing element comprising a pair of rigid elements 13 with a more or less elongated shape, each stably associated with one of said trolleys 2 by means of said first punctiform binding means 10, of the interlocking type 101, and protruding with respect to said trolley 2. For this variant, said second punctiform means 20 for binding the beams 5 to the rigid elements 13 are the same as those illustrated in the details shown in FIGS. 4a e 4b.

A reinforcing element thus shaped can be placed not only at the point of invariance of the distance between the trolleys 2, since the central portion of the covering 4, above the point of discontinuity between the two cantilever rigid elements 13, is free to extend completely, allowing a variation in the extension of the entire bellows protection 1.

For small-size bellows protections 1, with a short distance between the trolleys 2, it may be sufficient to have a single cantilever rigid element 13 associated with a single trolley 2, of sufficient length to support the entire protection.

The solution shown in FIG. 10 is particularly advantageous for conveyor belts with particular dimensions between the trolleys and for transport lines with significant changes in height.

With reference to FIG. 11 a section of a conveyor belt is shown where the bellows protection 1 interposed between two adjacent trolleys 2 comprises, as a reinforcing element 6 for the PVC beams 5, two articulated pantograph elements 11 extending in the horizontal plane. The construction is the same as that shown in FIGS. 7a, 7b and 7c. What is evident from FIG. 11 is how the reinforcing element 6 does not necessarily need to be placed at the point of invariance of the distance between two adjacent trolleys 2. Thanks to the ability of said articulated element 11 to expand and contract, it can in fact be placed below more lateral portions of the bellows protection 1, where the trolleys 2 necessarily vary their reciprocal distance when taking bends along the conveyor belt tracks.

The invention claimed is:

1. Bellows protection (1) adapted to connect adjacent trolleys (2) of a conveyor belt along an object transport line, where said conveyor belt comprises a plurality of trolleys (2) movable along tracks and connected to one another by means of connecting means (3) adapted to allow their reciprocal rotation at least around a vertical or horizontal axis, and where said bellows protection (1) comprises:
- a pleated covering (4) positioned between two adjacent trolleys (2) and connected thereto;
- at least one beam (5) adapted to support said covering (4) transversely to the direction of advancement of said transport line;
- a base structure adapted to resist vertically directed forces and to support said at least one beam (5),
- characterized in that said base structure comprises at least one reinforcing element (6) positioned so as to bind in at least one point said at least one beam (5), where said at least one reinforcing element (6) comprises:
  - first punctiform binding means (10) adapted to connect it at least indirectly to at least one of said two trolleys (2);
  - second punctiform binding means (20) adapted to connect it to said at least one beam (5) and adapted to avoid reciprocal transversal sliding between it and said at least one beam (5).

2. Bellows protection (1) according to claim 1, characterized in that said at least one reinforcing element (6) is positioned transversely to said at least one beam (5), comprises a first (6') and a second (6") end and at least one of said ends (6', 6") is associated with one of said trolleys (2) by means of said first punctiform binding means (10).

3. Bellows protection (1) according to claim 1, characterized in that said first punctiform binding means (10) comprise interlocking means (101).

4. Bellows protection (1) according to claim 1, characterized in that said first punctiform binding means (10) comprise spherical hinge means (102).

5. Bellows protection (1) according to claim 1, characterized in that said at least one reinforcing element (6) comprises an elongated rigid element (7) having a length substantially equivalent to the distance between said two adjacent trolleys (2) measured at the point of invariance thereof.

6. Bellows protection (1) according to claim 1, characterized in that said at least one reinforcing element (6) comprises a telescopic element (8) comprising at least one rod (8a) and one jacket (8b) where said at least one beam (5) is stably bound to said jacket (8b).

7. Bellows protection (1) according to claim 6, characterized in that it comprises a plurality of beams (5), and said at least one reinforcing element (6) comprises a plurality of telescopic elements (9) linked together, each telescopic element (9) comprising a rod (9a) and a jacket (9b), where each beam (5) is stably bound to the jacket (9b) of one of said telescopic elements (9).

8. Bellows protection (1) according to claim 1, characterized in that said at least one reinforcing element (6) comprises an articulated element (11, 12) which develops in a horizontal or vertical plane with respect to said covering (4), where said at least one articulated element (11, 12) comprises a plurality of second punctiform binding means (20) for said plurality of beams (5).

9. Bellows protection (1) according to claim 3, characterized in that said at least one reinforcing element (6) comprises an elongated rigid element (13), stably associated with one of said trolleys (2) by means of said interlocking means and protruding with respect to said trolley (2).

10. Bellows protection (1) according to claim 1, characterized in that said at least one reinforcing element (6) is placed substantially at the point of invariance of the distance between two adjacent trolleys (2) along said transport line.

11. Bellows protection (1) according to claim 1, characterized in that said at least one reinforcing element (6) is placed at an end of said at least one beam (5).

12. Bellows protection (1) according to claim 1, characterized in that said second punctiform binding means (20) comprise interlocking means.

13. Bellows protection (1) according to claim 12, characterized in that said second punctiform interlocking binding means (20) comprise a seat (21), created on said at least one beam (5), comprising at least one flexible fin (22) adapted to elastically deform due to the introduction of said at least one reinforcing element (6) into said seat (21) and to resume its original position once insertion has been completed, thereby holding said reinforcing element (6) in a stable position.

14. Bellows protection (1) according to claim 12, characterized in that said second punctiform interlocking binding means (20) comprise a hole (24), created on said at least one beam (5), adapted to house said reinforcing element (6), and at least two spacer elements (25), fitted onto said reinforcing element (6), placed between said trolleys (2) and said beam (5), symmetrically thereto, adapted to distance and maintain in a stable position said beam (5) along said reinforcing element (6) and to avoid reciprocal transversal sliding between them.

15. Bellows protection (1) according to claim 14, characterized in that said hole (24) is slotted.

16. Bellows protection (1) according to claim 1, characterized in that said second punctiform binding means (20) comprise hinges (26) with a horizontal axis parallel to said at least one beam (5).

* * * * *